(12) United States Patent  (10) Patent No.: US 7,971,587 B2
Gee et al.  (45) Date of Patent: Jul. 5, 2011

(54) APPARATUS AND METHOD FOR SOLAR THERMAL ENERGY COLLECTION

(75) Inventors: Randy Gee, Arvada, CO (US); Roland Winston, Merced, CA (US)

(73) Assignees: The Regents of the University of California, Oakland, CA (US); SolFocus, Inc., Mountain View, CA (US)

( * ) Notice: Subject to any disclaimer, the term of this patent is extended or adjusted under 35 U.S.C. 154(b) by 36 days.

(21) Appl. No.: 11/932,739

(22) Filed: Oct. 31, 2007

(65) Prior Publication Data

US 2009/0107487 A1 Apr. 30, 2009

(51) Int. Cl.
*F28F 1/20* (2006.01)
*F24J 2/04* (2006.01)
(52) U.S. Cl. ......... 126/635; 126/271; 126/650; 165/181
(58) Field of Classification Search .................. 126/635, 126/650, 652; 165/181
See application file for complete search history.

(56) References Cited

U.S. PATENT DOCUMENTS

| 4,002,499 | A | | 1/1977 | Winston |
| 4,016,860 | A | | 4/1977 | Moan |
| 4,052,782 | A | | 10/1977 | Weinstein et al. |
| 4,059,093 | A | * | 11/1977 | Knowles et al. ............. 126/636 |
| 4,069,810 | A | | 1/1978 | Tabor |
| 4,134,392 | A | | 1/1979 | Livermore et al. |
| 4,186,724 | A | | 2/1980 | Nelson |
| 4,196,590 | A | | 4/1980 | Fries |
| 4,205,655 | A | | 6/1980 | Hunt |
| 4,233,957 | A | | 11/1980 | Kenny |
| 4,258,699 | A | | 3/1981 | Masel et al. |
| 4,279,242 | A | | 7/1981 | Bogatzki |
| 4,282,857 | A | | 8/1981 | Pei |
| 4,284,068 | A | | 8/1981 | Gunderson |
| 4,297,989 | A | * | 11/1981 | Wozny et al. ................. 126/648 |
| 4,320,743 | A | | 3/1982 | Allen |
| 4,353,354 | A | | 10/1982 | Scoarnec et al. |
| 4,375,807 | A | | 3/1983 | Friendrich et al. |
| 4,413,616 | A | | 11/1983 | Tonomura et al. |
| 4,467,783 | A | | 8/1984 | Hurley et al. |

(Continued)

FOREIGN PATENT DOCUMENTS

CN 2379756 Y 5/2000

(Continued)

OTHER PUBLICATIONS

Winston, et al. *High Temperature CPC Collectors with Chinese Vacuum Tube Receivers.* Sep. 27, 2007.

(Continued)

*Primary Examiner* — Steven B McAllister
*Assistant Examiner* — Nikhil Mashruwala
(74) *Attorney, Agent, or Firm* — Antoinette F. Konski; Foley & Lardner LLP

(57) ABSTRACT

An apparatus for collecting solar energy includes a receptacle adapted for receiving solar thermal energy; an insert located within the receptacle, the insert being a heat pipe adapted to transfer heat; and an absorption device positioned proximate to and substantially conforming to at least a portion of an internal surface of the receptacle and thermally coupled to the insert. The insert enters the receptacle substantially at a cross-sectional center of the receptacle, and further inside the receptacle, the insert shifts to become closer to the absorption fin.

25 Claims, 2 Drawing Sheets

U.S. PATENT DOCUMENTS

| | | | | |
|---|---|---|---|---|
| 4,474,170 A | * | 10/1984 | McConnell et al. | 126/636 |
| 4,579,107 A | * | 4/1986 | Deakin | 126/654 |
| 4,774,932 A | | 10/1988 | Hollick | |
| 4,987,883 A | | 1/1991 | Watkins et al. | |
| 5,596,981 A | | 1/1997 | Soucy | |
| 6,019,485 A | | 2/2000 | Winston et al. | |
| 6,244,264 B1 | * | 6/2001 | Winston | 126/652 |
| 7,068,446 B2 | | 6/2006 | Jacobson et al. | |
| 7,412,976 B2 | | 8/2008 | Winston | |
| 2004/0261788 A1 | * | 12/2004 | Winston | 126/652 |
| 2005/0258261 A1 | | 11/2005 | Gast | |
| 2006/0191530 A1 | | 8/2006 | Xia et al. | |
| 2007/0196670 A1 | | 8/2007 | Barshllia et al. | |
| 2008/0245519 A1 | | 10/2008 | Ustun | |
| 2009/0139515 A1 | | 6/2009 | Gee et al. | |

FOREIGN PATENT DOCUMENTS

| | | | |
|---|---|---|---|
| CN | 2394166 Y | | 8/2000 |
| CN | 2580362 Y | | 10/2003 |
| DE | 3910540 A | * | 10/1990 |
| JP | 56085652 A | * | 7/1981 |
| JP | 5782650 A | * | 5/1982 |
| JP | 58203342 A | * | 11/1983 |
| WO | WO 83/03891 | | 11/1983 |
| WO | WO2005088207 | * | 2/2005 |
| WO | WO 2005/088207 | | 9/2005 |
| WO | WO 2005/088208 | | 9/2005 |
| WO | WO 2006/136243 | | 12/2006 |

OTHER PUBLICATIONS

International Search Report for PCT Application No. PCT/US2008/084402 mailed Feb. 2, 2009.

International Search Report for PCT Application No. PCT/US2008/081275 mailed Jan. 2, 2009.

U.S. Appl. No. 11/949,295—Non-Final Office Action dated Oct. 7, 2009.

U.S. Appl. No. 11/949,295—Final Office Action dated May 11, 2010.

* cited by examiner

APPARATUS AND METHOD FOR SOLAR THERMAL ENERGY COLLECTION

BACKGROUND OF THE INVENTION

The present invention relates generally to the field of solar thermal energy. In particular, the present invention relates to solar thermal energy collectors.

Solar thermal collectors have been utilized for over 20 years. The designs have varied from flat plate, box, air, integral, unglazed more commonly to parabolic troughs and dishes and full power towers. Though they have been commercially available for over 20 years, recent designs of evacuated tubes have become more efficient and less costly, allowing them to be both commercially and domestically available as well as more widely utilized. Some devices contain heat removal inserts that are placed within the tubes that serve the purpose of transferring the collected energy to a heat-transfer fluid and are used to transfer heat to a manifold located at the end of the tubes or in connection with the inserts.

Conventional designs are limited in their ability to transfer heat from the collector. It is desirable to improve the efficiency with which such heat is transferred.

SUMMARY OF THE INVENTION

In one aspect, the invention includes an apparatus for collecting solar energy. The apparatus includes a receptacle adapted for receiving solar thermal energy; an insert located within the receptacle, the insert being a heat pipe adapted to transfer heat; and an absorption device positioned proximate to and substantially conforming to at least a portion of an internal surface of the receptacle and thermally coupled to the insert. The insert enters the receptacle substantially at a cross-sectional center of the receptacle, and further inside the receptacle, the insert shifts to become closer to the absorption fin.

In one embodiment, the receptacle has a vacuum drawn interior that is sealed with a glass to metal seal.

In one embodiment, the apparatus further comprises a non-imaging optic reflector located external to the receptacle and adapted to direct solar thermal energy to the receptacle. The reflector may be a compound parabolic concentrator (CPC).

In one embodiment, a substantial portion of one side of the insert is adjacent the absorption device. The insert may shift to become closer to a non-imaging optical reflector.

In one embodiment, the insert is a metal selected from the group consisting of brass, copper and aluminum. The absorption device may also be a metal selected from the group consisting of brass, copper and aluminum.

In one embodiment, the apparatus further comprises a manifold adapted for circulating a fluid and thermally coupled to the insert, and a pump utilized for the circulating. The manifold may be thermally coupled to multiple inserts.

In one embodiment, the absorption device is coated with a coating. The coating may be aluminum nitride.

In one embodiment, the absorption device has a corrugated shape.

In one embodiment, the insert is a heat pipe with a hollow interior, the hollow interior having a heat transfer fluid therein. The heat transfer fluid may be adapted to transfer heat by vaporizing and condensing.

In one embodiment, the apparatus further comprises a seal connecting the receptacle to the insert. The seal may be a metallic disk, and wherein the insert extends through a center of the metallic disk.

In another aspect of the invention, a method for collecting solar thermal energy includes positioning a reflector exterior to a receptacle, the receptacle containing an absorption device positioned proximate to and substantially conforming to at least a portion of an internal surface of the receptacle, wherein the reflector is adapted to direct sunlight onto the absorption device; positioning an insert inside the receptacle, the insert being coupled to the absorption device, and the insert being a heat pipe adapted to transfer heat; and positioning the insert such that the insert enters the receptacle substantially at a cross-sectional center of the receptacle, and further inside the receptacle, the insert shifts to become closer to the absorption fin.

DETAILED DESCRIPTION OF THE PREFERRED EMBODIMENTS

Embodiments of the present invention provide method and apparatus for collection and/or transferring of solar thermal energy. In this regard, embodiments of the present invention may provide inexpensive and efficient manners for collection of solar thermal energy.

Figure 1:
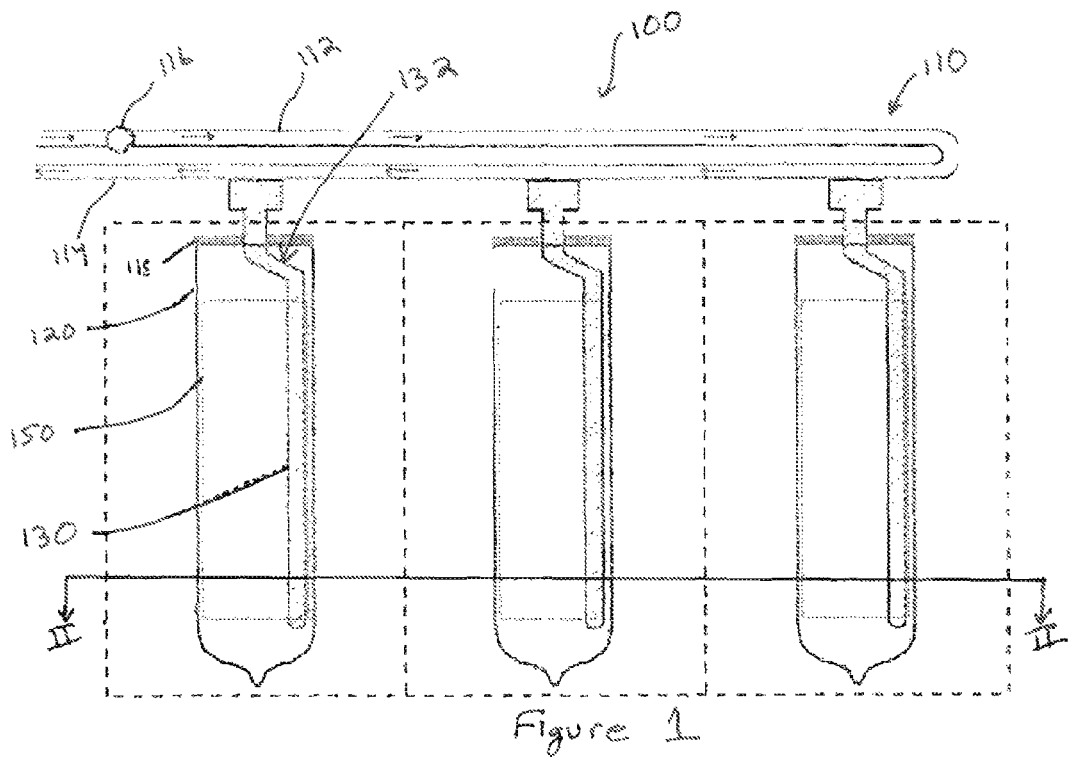
FIG. 1 illustrates a solar thermal energy collecting apparatus according to an embodiment of the present invention.
Figure 2A:
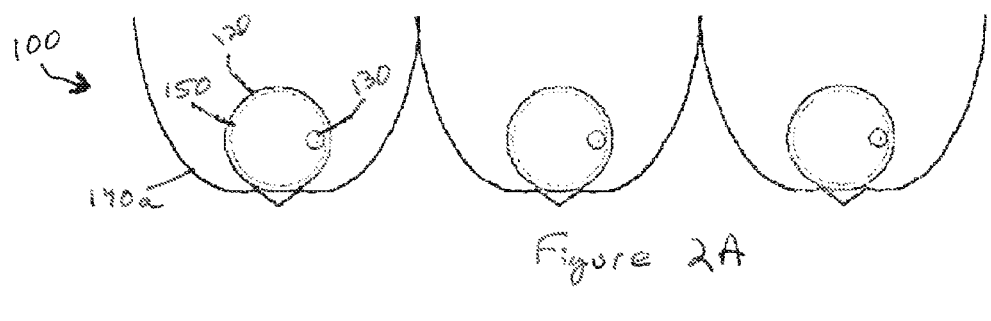
FIGS. 2A and 2B illustrate cross-sectional views taken along II-II of FIG. 1 of solar thermal energy collecting apparatus according to embodiments of the present invention.
Figure 2B:
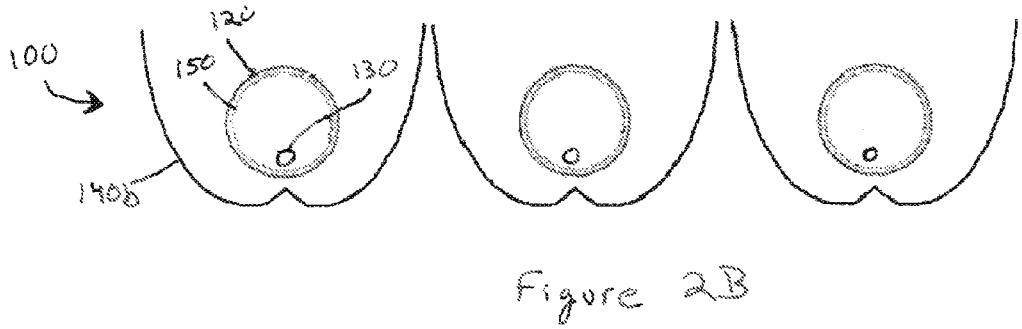

Referring to FIGS. 1, 2A and 2B, a solar thermal energy collection apparatus 100 according to an embodiment of the present invention is illustrated. In the illustrated embodiment, the apparatus 100 includes one or more receptacles 120, each receptacle 120 having an insert, such as heat pipe 130, located therein. In the illustrated embodiment, the receptacle 120 is a single-layer cylindrical glass tubing that is closed at one end. The single-layer glass configuration allows for operation of the apparatus at higher temperatures and results in increased heat removal, as described below. Of course, in other embodiments, various other types of receptacles may be used. For example, in one embodiment, the receptacle 120 may be a double-walled dewar with an inner wall and an outer wall. The region between the inner wall and the outer wall may be evacuated to reduce heat loss. The level of evacuation of the region between the inner wall and the outer wall may be varied to either increase efficiency (e.g., reduce heat loss) or improve cost-effectiveness.

The other end of the receptacle 120 may be sealed with, for example, a metallic disk 118 by way of a glass-to-metal seal. In other embodiments, the metallic disk 118 may be replaced with another type of closure that is sealed with the receptacle 120. Preferably, the closure allows simple and efficient assembly of the receptacle 120 to the apparatus 100 while ensuring integrity in the sealing of the receptacle. In other embodiments the metallic device may be replaced with a glass device used as a seal. In other embodiments, the metallic disk may be replaced with a device having a non-disk configuration. Any device may be used instead of metal disk 118 as long as a reliable seal is a provided between the receptacle 120 and a manifold 110.

In one embodiment, the inside of the receptacle 120 is evacuated. The vacuum inside the receptacle 120 facilitates reduction of thermal loss, thereby improving efficiency of the apparatus, as described below. In this regard, the metallic disk 118 or other such closure provides sufficient sealing to maintain the vacuum within the receptacle 120. The level of evacuation of the receptacle 120 may be varied to either increase efficiency (e.g., reduce heat loss) or improve cost-effectiveness.

The receptacle 120 is positioned such that an external reflector 140 concentrates solar thermal energy (or solar irradiance) onto the receptacle 120. The shape of the reflector 140 may be selected from a variety of shapes. In some embodiments, the reflector 140 may operate in conjunction with a solar tracking component. Preferably, the reflector 140 is adapted to operate in the absence of such a tracking component. In one embodiment, the external reflector 140 is a compound parabolic concentrator (CPC). Such reflectors are well known to those skilled in the art.

FIGS. 2A and 2B illustrate two embodiments of an external reflector 140a, 140b for use with embodiments of the present invention. Referring first to FIG. 2A, the external reflector 140a has two concave, parabolic components joined by a central convex, v-shaped component. Each concave component forms substantially half of a parabola.

Referring now to FIG. 2B, the external reflector 140b includes two concave, parabolic segments joined to each other. In this embodiment, each concave component forms substantially more than half of a parabola. In this regard, the two concave segments join to form an inverted "v" shape. Other reflector configurations may also be used.

Thus, the shape of the reflector 140 directs all sunlight incident on the reflector 140 within a predetermined angle of incidence onto the receptacle 120. In this regard, sunlight is concentrated efficiently onto the receptacle 120 while minimizing heat loss. Further, the evacuated configuration of the receptacle 120 facilitates minimizing of the heat loss. Thus, sufficient efficiency of the apparatus 100 can be achieved in the absence of a solar tracking component, thereby resulting in significant cost reduction.

Each receptacle 120 is provided with an insert, such as heat pipe 130, adapted to fit within the receptacle 120. The heat pipe 130 may be formed of a variety of materials. In one embodiment, the heat pipe 130 is formed of a metal from the group of brass, copper and aluminum. The heat pipe 130 enters the receptacle substantially at the cross-sectional center of the receptacle through the sealed area (e.g., the metal disk 118). In this example, a seal may be formed between the heat pipe 130 and the metal disk 118 to maintain a vacuum within the receptacle 120. Further inside the receptacle 120, the heat pipe 130 includes a shifting portion 132 which shifts the heat pipe 130 to become closer to a wall of the receptacle 120. In one embodiment, the shifting portion 132 shifts the heat pipe 130 toward the cross-sectional bottom of the tube, as shown in FIG. 2B, so that it is close to the apex of the reflector. In another embodiment, the shift may be further from the reflector and to one side as shown in FIG. 2A.

The heat pipe 130 is coupled to a manifold 110, which is also coupled to a heat pipe corresponding to each of the other receptacles of the apparatus 100. The number of receptacles 120 and corresponding heat pipes 130 coupled to the manifold 110 may be selected from any practical number dependant on the size of the apparatus 100 desired.

In one embodiment, as illustrated in FIGS. 1, 2A and 2B, the heat pipe 130 may be coupled to the receptacle 120 in a variety of manners including, but not limited to, welding. In one embodiment, the coupling of the receptacle 120 and the heat pipe 130 includes use of screw-type threads formed on the manifold 110 and the tube 130, similar to those found on conventional plumbing joints, that may use a thread seal. In this embodiment, the vacuum area in the receptacle 120 and the seal maintaining the vacuum are provided with the receptacle 120 and heat pipe 130 together. This provides ease of on-site assembly and ease of maintenance and repair.

In one embodiment, the heat pipe 130 is an integral part of the manifold 110. In this regard, the heat pipe 130 may be formed as an integral part of the manifold 110 and does not include any joints, connections or seals. The integral configuration of the heat pipe 130 and the manifold 110 reduces the number of parts required, thereby reducing the time and effort required for installation and assembly of the apparatus 100 in the field. Thus, during assembly, the receptacle 120 only needs to be positioned around the heat pipe 130, a vacuum area pulled and secured with, for example, the metallic disk 118. Further, the integral configuration eliminates a potential leakage point for fluid flowing through the receptacle, as described below.

The manifold 110 includes an inlet pipe 112 and an outlet pipe 114 for circulating a fluid through the manifold 110 and the heat pipe 130. A pump 116 is provided to circulate the fluid 110. The pump 116 may be located in the main portion of the manifold (as shown) or away from the receptacles 120. The dimensions of the inlet pipe 112, the outlet pipe 114 and the pump 116 may be selected according to the requirements of the specific implementation of the collector 100.

The inlet pipe 112 and/or the outlet pipe 114 of the manifold 110 are coupled to the heat pipe 130. In one embodiment, the coupling of the heat pipe 130 to the manifold 110 is a physical coupling, such as a welding. In other embodiments, the heat pipe 130 may be thermally coupled to the manifold 110 without a physical coupling. In one embodiment, the heat pipe 130 is adapted to transfer heat from the receptacle 120 to the manifold 110. In a particular embodiment, the heat pipe 130 has a hollow interior section. The hollow interior may contain a heat transfer fluid therein. The heat transfer fluid may be selected from a variety of fluids and, in particular, may be selected based on the operating temperature of the apparatus 100. In this regard, heat from the receptacle may cause the heat transfer fluid to vaporize. As the vapors approach the manifold, the vapors may condense, thereby transferring heat to the manifold. The vaporization/condensation may occur continuously as solar thermal energy is directed to the receptacle 120.

An absorption device, such as absorption fin 150, is positioned within the receptacle 120. The absorption fin 150 may be formed of a variety of materials and may take a shape other than that generally categorized as a fin. In one embodiment, the absorption fin 150 is formed of a metal from the group of brass, copper and aluminum. In one embodiment, the absorption fin 150 is positioned proximate to the internal surface of the receptacle 120. Further, the absorption fin 150 is configured to substantially conform to the internal surface of the receptacle 120. Although the embodiment illustrated in FIGS. 1, 2A and 2B includes an absorption fin 150 which conforms to the entire circular cross section of the receptacle 120, other embodiments may include fins which conform to a portion of the receptacle 120.

In one embodiment, the outer surface of at least a portion of the absorption fin 150 is covered with a selective coating. The coating facilitates thermal absorption of solar thermal energy by the absorption fin 150 to increase efficiency of the apparatus 100. The coating may be aluminum nitride cermets or other types of materials that facilitate thermal absorption.

In one embodiment, the absorption fin 150 is thermally coupled to the heat pipe 130 in order to facilitate transfer of thermal energy to the manifold 110. In this embodiment, a substantial portion of one side of the heat pipe 130 is adjacent the absorption fin 150. The heat pipe 130 may also be adjacent the absorption fin 150 so as to be thermally coupled to it, but not be physically coupled. In another embodiment, the absorption fin 150 is integrally formed with the heat pipe 130. In other embodiments, the absorption fin 150 is thermally coupled to the heat pipe 130 by mechanical means, such as welding, for example. The length of the absorption fin 150 and the heat pipe 130 within the receptacle 120 may be as long as the receptacle 120 in which it is located or the devices 130, 150 may be shorter than the receptacle 120.

Figure 3:
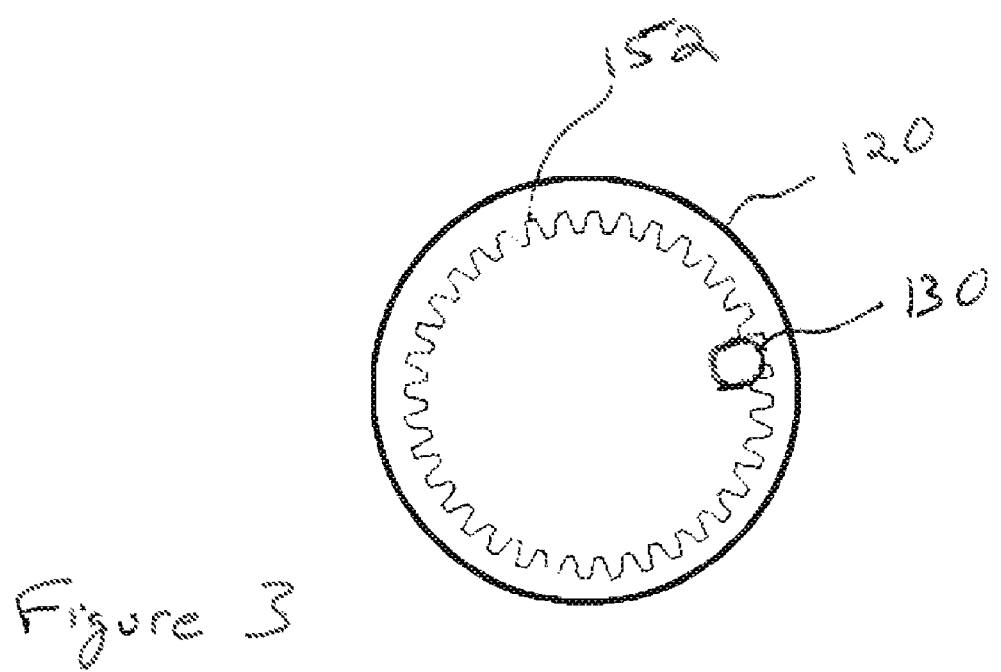
FIG. 3 illustrates a cross-sectional view of a receptacle with another embodiment of an absorption device.

As illustrated most clearly in FIG. 2, the absorption fin 150 may have a circular cross section to conform to the circular cross section of the receptacle 120. In the embodiment illustrated in FIG. 2, the absorption fin 150 is provided with a substantially smooth, continuous surface. In other embodiments, as exemplarily illustrated in FIG. 3, an absorption fin 152 may be provided with a corrugated surface. The corrugations provide an increased surface area for the absorption fin 152 while still conforming to the internal surface of the receptacle 120.

In operation, a fluid is circulated through the manifold 110 via the pump 116. The flowrate of the fluid through the manifold 110 may be adjusted for particular conditions and particular implementations. The fluid circulates through the inlet pipe 112 and out the outlet pipe 114 with thermal coupling to one or more heat pipes 130. The solar thermal energy collected by the receptacle 120 and the absorption fin 150 is transferred by the heat pipe 130 to the manifold 110. The fluid circulating through the inlet pipe 112 and the outlet pipe 114 is heated as a result of the heat transfer by the heat pipe 130. Since no fluid flows between the manifold and any of the other components (e.g., heat pipe, receptacle, etc.), no leakage issues are present. Those skilled in the art will understand that the circulation path (inlet pipe to outlet pipe) may be reversed in other embodiments, which are also contemplated within the scope of the present invention.

Thus, solar thermal energy is directed by the reflector 140 onto the receptacle 120. The solar thermal energy is absorbed by the receptacle 120 and, more specifically, the absorption coating on the outer surface of the absorption fin 150. The vacuum created within the receptacle 120 reduces thermal heat loss by eliminating the conduction and convection from the absorption fin 150 and the heat pipe 130.

Solar thermal energy absorbed by the receptacle and the absorption fin 150 is transferred by the heat pipe 130 in the form of heat to the manifold 110. The fluid circulating in the manifold is heated by the thermal energy transferred, thereby facilitating transfer of solar thermal energy from the apparatus 100. The fluid circulated through the apparatus 100 may be selected from a variety of fluids. In one embodiment, the fluid is mineral oil.

Embodiments of the present invention are capable of heating the fluid to temperatures of above 280 degrees Fahrenheit without the use of a solar tracker component. Certain embodiments are capable of heating the fluid to temperatures of above 300 degrees Fahrenheit as the fluid exits the receptacle 120. Thus, embodiments of the present invention can provide efficient collection of solar thermal energy in a cost-effective manner.

While particular embodiments of the present invention have been disclosed, it is to be understood that various different modifications and combinations are possible and are contemplated within the true spirit and scope of the appended claims. There is no intention, therefore, of limitations to the exact abstract and disclosure herein presented.

What is claimed is:

1. An apparatus for collecting solar energy, comprising:
a receptacle adapted for receiving solar thermal energy;
an insert located within the receptacle, the insert being a heat pipe adapted to transfer heat to a manifold, the heat pipe being further configured to have no fluid flowing between the heat pipe and the manifold; and
an absorption device positioned proximate to and substantially conforming to at least a portion of an internal surface of the receptacle and coupled to the insert;
wherein the insert enters the receptacle substantially at a cross-sectional center of the receptacle, and further inside the receptacle, the insert includes a shifting portion which shifts the insert to become closer to the absorption device; wherein a reflector is adapted to direct sunlight onto the absorption device.

2. The apparatus of claim 1, wherein the receptacle has a vacuum drawn interior that is sealed with a glass to metal seal.

3. The apparatus of claim 1, further comprising a non-imaging optic reflector located external to the receptacle and adapted to direct solar thermal energy to the receptacle.

4. The apparatus of claim 3, wherein the reflector is a compound parabolic concentrator (CPC).

5. The apparatus of claim 1, wherein a substantial portion of one side of the insert is adjacent the absorption device.

6. The apparatus of claim 5, wherein the insert shifts to become closer to a non-imaging optical reflector.

7. The apparatus of claim 1, wherein the insert is a metal selected from the group consisting of brass, copper and aluminum.

8. The apparatus of claim 1, wherein the absorption device is a metal selected from the group consisting of brass, copper and aluminum.

9. The apparatus of claim 1, further comprising:
a manifold adapted for circulating a fluid and thermally coupled to the insert; and
a pump utilized for the circulating.

10. The apparatus of claim 9, wherein the manifold is thermally coupled to multiple inserts.

11. The apparatus of claim 1, wherein the absorption device is coated with a coating.

12. The apparatus of claim 11, wherein the coating is aluminum nitride.

13. The apparatus of claim 1, wherein the absorption device has a corrugated shape.

14. The apparatus of claim 1, wherein the insert is a heat pipe with a hollow interior, the hollow interior having a heat transfer fluid therein.

15. The apparatus of claim 14, wherein the heat transfer fluid is adapted to transfer heat by vaporizing and condensing.

16. The apparatus of claim 1, further comprising a seal connecting the receptacle to the insert.

17. The apparatus of claim 16, wherein the seal is a metallic disk, and wherein the insert extends through a center of the metallic disk.

18. A method for collecting solar thermal energy, comprising:
positioning a reflector exterior to a receptacle, the receptacle containing an absorption device positioned proximate to and substantially conforming to at least a portion of an internal surface of the receptacle, wherein the reflector is adapted to direct sunlight onto the absorption device;
positioning an insert inside the receptacle, the insert being coupled to the absorption device, and the insert being a heat pipe adapted to transfer heat to a manifold, the heat pipe being further configured to have no fluid flowing between the heat pipe and the manifold; and
positioning the insert such that the insert enters the receptacle substantially at a cross-sectional center of the receptacle, and further inside the receptacle, the insert includes a shifting portion which shifts the insert to become closer to the absorption device.

19. The method of claim 18, wherein a manifold is adapted to circulate the fluid, the insert being thermally coupled to the manifold.

20. The method of claim 19, wherein the manifold is coupled to multiple inserts.

21. The method of claim 18, wherein the absorption device is coated with a coating of aluminum nitride.

22. The method of claim 18, wherein the reflector is a compound parabolic concentrator (CPC).

23. The method of claim 18, wherein the insert and the absorption device are formed of a metal selected from the group consisting of brass, copper and aluminum.

24. The method of claim 18, wherein the insert is a heat pipe with a hollow interior, the hollow interior having a heat transfer fluid therein.

25. The method of claim 24, wherein the heat transfer fluid is adapted to transfer heat by vaporizing and condensing.

* * * * *